United States Patent
Arkay-Leliever

(10) Patent No.: US 7,177,719 B2
(45) Date of Patent: Feb. 13, 2007

(54) PATTERN BUILDER

(75) Inventor: Christian P. Arkay-Leliever, Fairfield, CT (US)

(73) Assignee: Skidmore, Owings & Merrill LLP, New York, NY (US)

( * ) Notice: Subject to any disclaimer, the term of this patent is extended or adjusted under 35 U.S.C. 154(b) by 0 days.

(21) Appl. No.: 10/463,191

(22) Filed: Jun. 16, 2003

(65) Prior Publication Data

US 2004/0254670 A1   Dec. 16, 2004

(51) Int. Cl.
  *G06F 19/00* (2006.01)
(52) U.S. Cl. .................................................. 700/131
(58) Field of Classification Search ............ 700/95–97, 700/122, 130–135; 715/769–771, 810, 825, 715/832, 835, 838–840, 866
See application file for complete search history.

(56) References Cited

U.S. PATENT DOCUMENTS

| | | | | |
|---|---|---|---|---|
| 5,016,183 A * | 5/1991 | Shyong | | 700/131 |
| 5,966,310 A * | 10/1999 | Maeda et al. | | 707/104.1 |
| 5,966,454 A * | 10/1999 | Thomas et al. | | 382/111 |
| 6,065,969 A * | 5/2000 | Rifkin et al. | | 434/100 |
| 6,144,890 A * | 11/2000 | Rothkop | | 700/97 |
| 6,354,212 B1 * | 3/2002 | Krinsky | | 101/483 |
| 6,434,441 B1 * | 8/2002 | Beauchamp et al. | | 700/98 |
| 6,516,240 B2 * | 2/2003 | Ramsey et al. | | 700/131 |
| 6,715,423 B2 * | 4/2004 | Fujii et al. | | 101/484 |
| 6,741,904 B1 * | 5/2004 | Gage | | 700/132 |
| 6,748,290 B2 * | 6/2004 | Somaia | | 700/140 |
| 2002/0034607 A1 * | 3/2002 | Stoyles | | 428/95 |
| 2003/0139840 A1 * | 7/2003 | Magee et al. | | 700/133 |
| 2004/0236634 A1 * | 11/2004 | Ruuttu | | 705/26 |

FOREIGN PATENT DOCUMENTS

| | | | |
|---|---|---|---|
| EP | 1 020 807 A1 | * | 7/2000 |
| WO | WO 00/60513 A1 | * | 10/2000 |
| WO | WO 01/24077 A1 | * | 4/2001 |

OTHER PUBLICATIONS

Milliken's Approved Installation Methods obtained from http://www.millikencarpetsamplestudio.com/SmpStdUS/fcso.nsf/Display+Colors?OpenAge... on Jun. 19, 2003 (2 pages).
Milliken's Approved Installation Methods obtained from http://www.millikencarpetsamplestudio.com/SmpStdUS/fcso.nsf/Display+Colors?OpenAge... on Jun. 19, 2003 (1 page).
Milliken's Multi-Tile Repeat pattern obtained from http://www.millikencarpetsamplestudio.com/SmpStdUS/fcso.nsf/Display+Colors?Open Age... on Jun. 19, 2003 (1 page).
Milliken's Exclusive Product Line obtained from http://www.millikencarpetsamplestudio.com./SmpStdUS/fcso.nsf/Display+Colors?Open Age... on Jun. 19, 2003 (1 page).

* cited by examiner

*Primary Examiner*—Maria N. Von Buhr
(74) *Attorney, Agent, or Firm*—Sonnenschein, Nath & Rosenthal LLP

(57) ABSTRACT

The present invention provides a method of manufacturing an item. The method includes providing a pattern building program to a client, wherein the client is to build a pattern using the program. The method also includes manufacturing the item based on the pattern. Preferably, the item is one of a textile, a tile, a wallpaper, or a carpet.

17 Claims, 7 Drawing Sheets

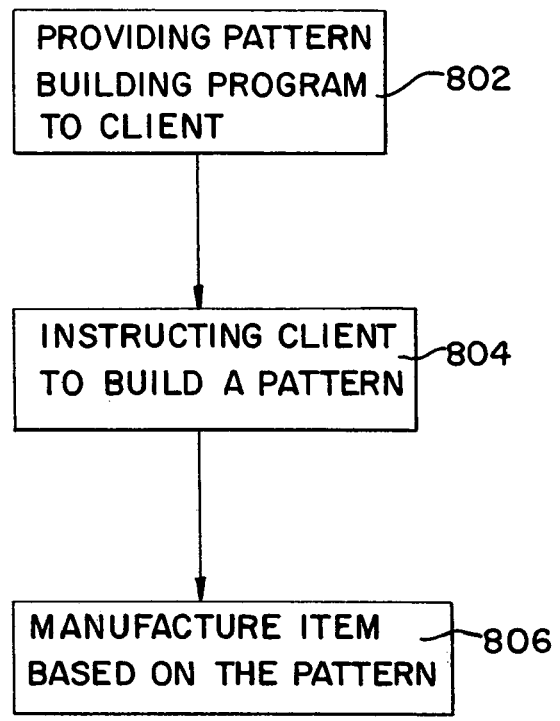
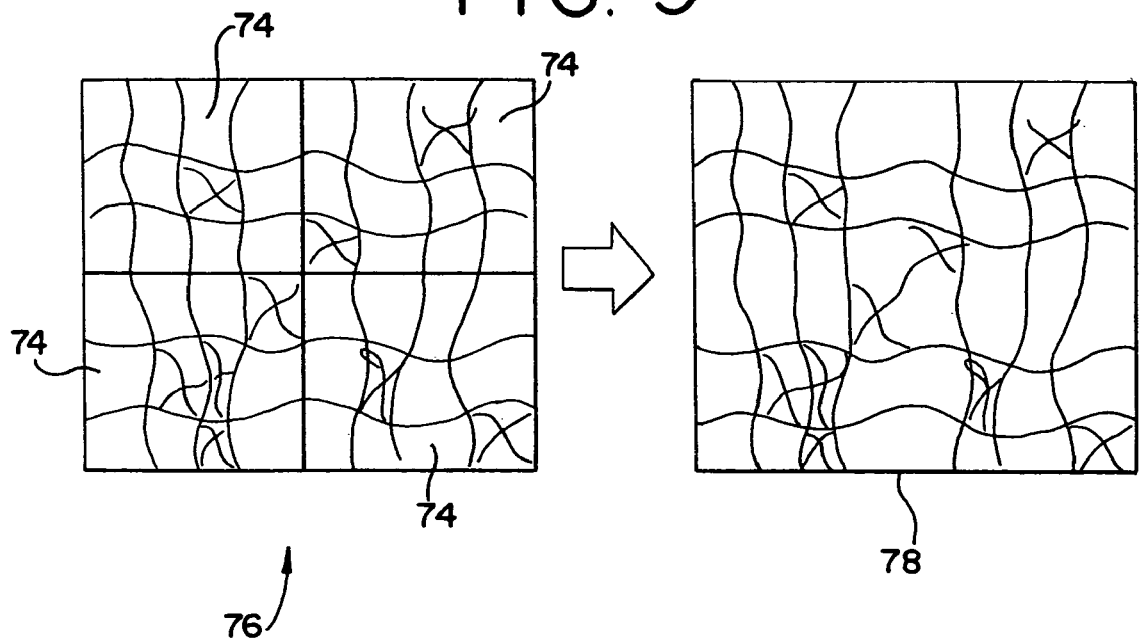

PATTERN BUILDER

REFERENCE TO COMPACT DISCS

Attached hereto, and incorporated herein by reference, are two compact discs, labeled "Copy 1" and "Copy 2" which are both identical. Each compact disc contains the source code for the "Pattern Building Program" which is described herein. The source code is subject to copyright protection. The copyright owner has no objection to reproduction of the patent disclosure, as it appears in the Patent and Trademark Office patent files or records, but otherwise reserves all copyright rights whatsoever.

BACKGROUND

This invention relates generally to patterns and methods for making the same and, more particularly, this invention relates to a method and computer program for building a pattern used to manufacture an item.

Items for decorating the interiors of buildings and homes, such as carpeting, textiles, tiles, and wallpaper, come in a limited amount of patterns for selection by a client. Clients often have varying tastes and needs, and often desire a much larger selection of patterns to be available for an item when purchasing that item. It would be desirable to provide the clients with the ability to create an endless variety of patterns which can then be used to manufacture an item based upon one of these patterns.

BRIEF SUMMARY

According to one aspect of the present invention, a method of manufacturing an item is provided. The method includes providing a pattern building program to a client, wherein the client is to build a pattern using the program. The method also includes manufacturing the item based on the pattern. Preferably, the item is one of a textile, a tile, a wallpaper, or a carpet.

According to another aspect of the present invention, a computer program for building a pattern for use in manufacturing an item based on the pattern, is provided. The program includes a storage device. The program also includes selection code, tool code, and format code all on the storage device. The selection code is for providing a client with a plurality of tiles for selection. The tool code is for providing a client tools for building a pattern. The format code is for providing the manufacturer with the pattern in a format that the manufacturer can use to manufacture the item.

According to another aspect, a method for building a pattern for use in manufacturing an item based on the pattern, is provided. The method includes providing a tile to a client for forming the pattern and providing the client with a grid which forms a plurality of spaces for placing the tile in. The method also includes prompting the client to form a pattern by dragging the tile in one of the spaces.

The following drawings and descriptions set forth additional advantages and benefits of the invention. More advantages and benefits are obvious of the description and may be learned by practice of the invention.

BRIEF DESCRIPTION OF SEVERAL VIEWS OF THE DRAWINGS

FIG. 8 illustrates a block diagram for building a pattern and manufacturing an item based on the pattern; and FIG. 9 illustrates a pattern built by a program and an item manufactured based on the pattern, according to one embodiment.

Figure 1:
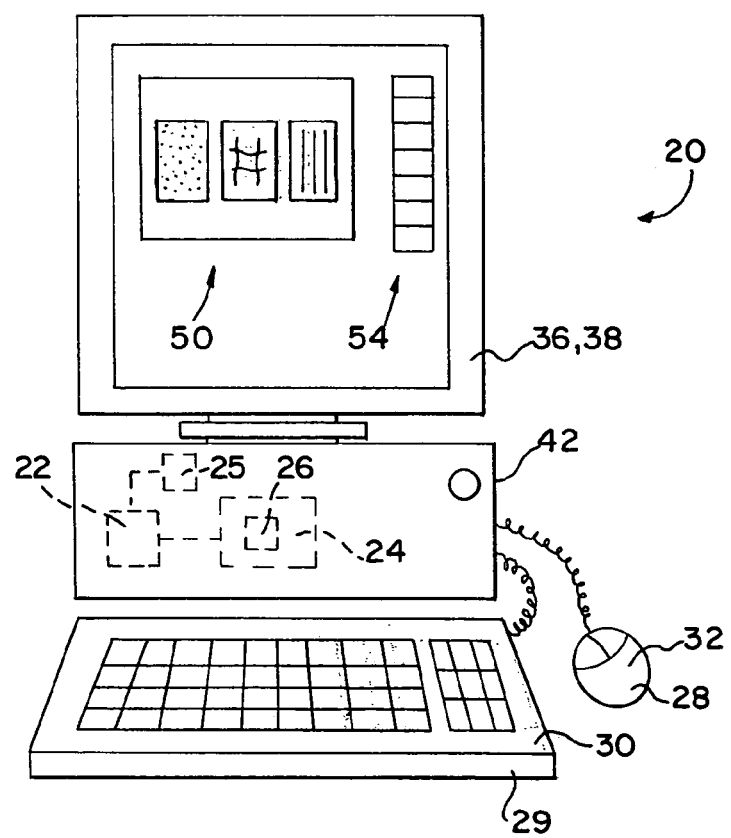
FIG. 1 illustrates a computer system for running a program, according to one embodiment.

For simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

DETAILED DESCRIPTION

The present invention discloses methods, apparatus, and computer programs for building or creating a pattern and for manufacturing an item based upon the pattern. In particular, the present invention discloses a program which provided a client with tools to build an almost endless selection of patterns. Upon building a pattern using the tools, a manufacturer may then build an item that is based on the pattern built by the client. Accordingly, by providing a program that allows a client to build a unique pattern, the manufacturer can then custom build an item, such as a piece of carpeting, based upon the unique pattern built by the client. In this way, the client can custom design and purchase an item that is manufactured based on almost endless selection of patterns.

As will be appreciated by one of skill in the art, the present invention may be embodied as a method, data processing system or program. Accordingly, the present invention may take the form of an entirely hardware embodiment such as in a semiconductor device, an entirely software embodiment, or an embodiment combining software and hardware aspects. Furthermore, the present invention may take the form of a computer program product on a computer-readable storage medium having computer-readable program code embodied in the medium. Any suitable storage medium may be utilized including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives.

Figure 2:
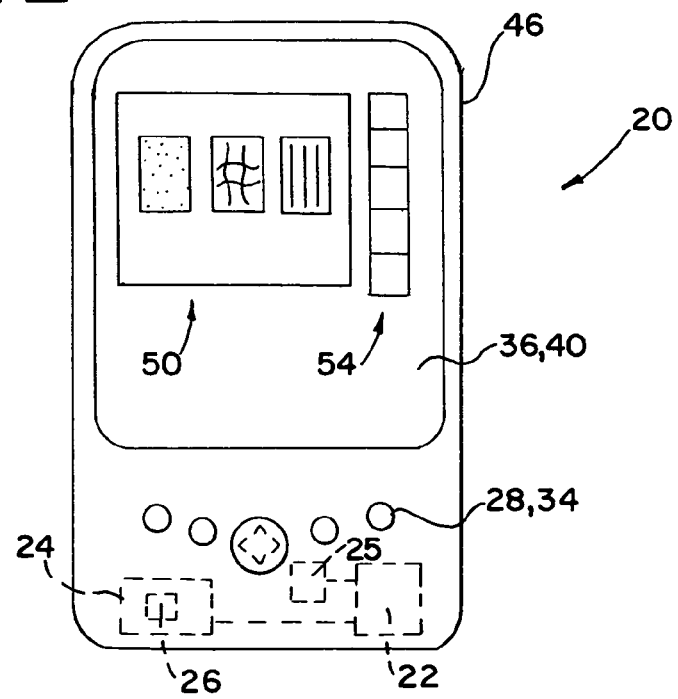
FIG. 2 illustrates a computer system for running a program, according to one embodiment.

FIG. 1 illustrates a computer system 20 in which a pattern building program 26 may be utilized, according to one preferred embodiment. Computer system 20 comprises a processor 22, a storage device 24, an input device 28, and a display 36. Computer system 20 includes devices such as: a stand-alone desktop computer 42 having a cathode ray tube 38 serving as a display 36, as illustrated in FIG. 1; a Personal Digital Assistant (PDA); a notebook computer; a laptop computer; a tablet computer 46, such as a Tablet PC having an integrated display 36, such as a liquid crystal display 40, and an integrated input device 28, such as buttons 34, as illustrated in FIG. 2. The processor 22 is any programmable electronic device that can store, retrieve, and process data, such as that contained within pattern building program 26. As seen in FIG. 1, the processor 22 is in communication with the storage device 24. Processor 22 runs programs, such as program 26, from the storage device 24 and displays information that results from running those programs on the display 36. The contents of the display 36 may be controlled or altered by the processor 22.

The storage device 24 is operatively coupled with the processor 22, wherein the processor 22 can store and retrieve data from the storage device 24. The storage device 24 permanently or temporarily stores information and programs, such as program 26. The storage device 24 utilizes any suitable type of storage medium for storing information, including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives. In addition to program 26, the storage device 24 may contain additional programs which may be needed to run program 26, such as an operating system; a web-browser; and a web browser plug-in such as a JAVA™ plugin, and a Macromedia Flash Player™ plug-in. Program 26 executes in processor 22 from storage device 24 and assists a client in building a pattern 76, as described below.

For obtaining input from a user, the computer system 20 may utilize input devices 28, as illustrated in FIG. 1. Input devices 28 may be used to designate areas of the screen by performing a pointing operation on those areas. Input devices 28 may also be used to input or select objects shown on the display, such as those generated by program 26. Input devices 28 may also be used to input information, requested by the program 26 for building a pattern 76. Input devices 28 may include any device that can be used to input and send information to the processor by a client, such as a mouse 32, a keyboard 30, a button 34, and a stylus. Input devices 28 also allow a user to move a pointer 84 shown on the display 36 over an object shown on the display 36, and to select that object. Input devices 28 can also be used to input text and other information to the processor 22.

Computer system 20 operates or runs pattern building program 26 stored on storage device 24 within computer system 20. Computer system 20 runs pattern building program 26 using processor 22 which accesses the information within pattern building program 26 stored in storage device 24. Preferably, processor 22 copies pattern building program 26 into a secondary storage 25 device, such as a random access memory, in order to run the program 26 and more readily access the information stored within the program 26.

The program 26 allows a client to build a pattern 76 which may later be used by a manufacturer in manufacturing an item 78 based on the pattern. The client is any individual, group of individuals, or entity, that may be served by the manufacturer. The manufacturer is any individual, group of individuals, or entity wishes to serve the client. The client and the manufacturer are two different individuals, groups of individuals, or entities. Upon request, the manufacturer is able to manufacture the item 78 for the client based upon the pattern 76 that is built by the client. Program 26 aids the client in building the pattern 76. The pattern 76 includes any type of design that can be created, built, or made by the client. The pattern 76 may comprise multiple colors, shapes, objects, and images alone or in combination. In one embodiment, pattern 76 is built using at least one, but preferably a plurality of, tiles 68 presented to the client.

Figure 6:
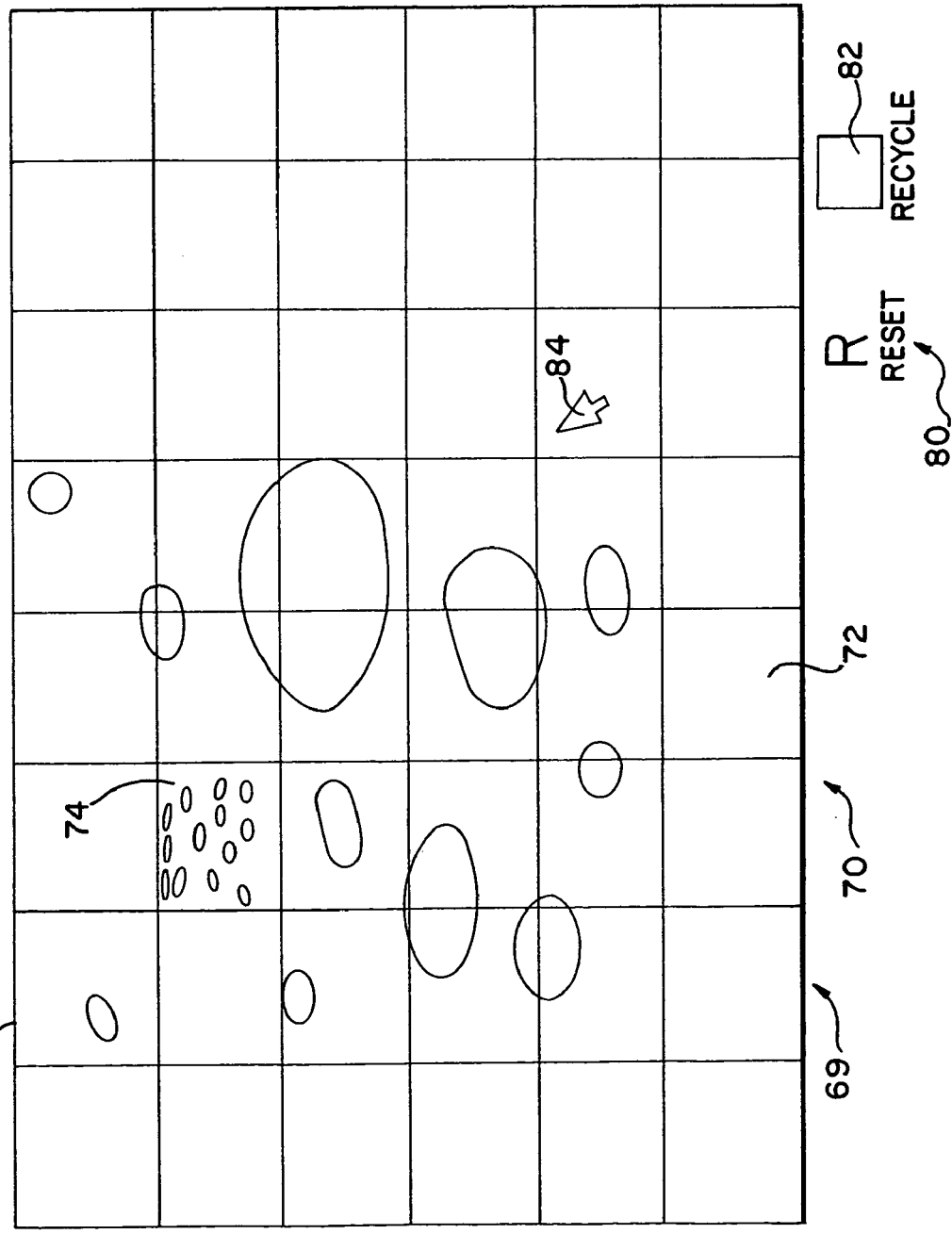
FIG. 6 illustrates a grid and a toolbar of a program along with a pattern in the grid, according to one embodiment.

Preferably, the program provide the client with tools 56 which aid the client in building the pattern 76 in a pattern building area 69 that is also provided to the client, as illustrated in FIG. 6. Tools 56 are an items provided by the program 26 which aid or assist the client in building the pattern 76. Using the tools 56, the client is able to build a pattern 76, as illustrated in FIG. 6. Preferably, tools 56 include such items as a pencil tool 58, a paint brush tool 60, a rubber stamp tool 62, a paint can tool 64, a selection tool 66, and a tile 68. The pencil tool 58 allows the client to draw lines in curves within the pattern building area 69. The paint brush tool 60 allows the client to paint lines and curves in varying thickness in the pattern building area 69. The rubber stamp tool 62 lets the client stamp a selected image in the pattern building area 69. The paint can tool 64 allows the client to fill a portion of or the entire pattern building area 69 with a set color or a pattern of colors. The selection tool 66 allows the client to select a portion of the pattern 76 formed within the pattern building area 69. Upon selection of a portion of the pattern 76, the client may delete or move that portion. Additionally, the toolbar 54 may comprise any other type of tool 56 that may be used by the client to form any type of image on a display 36. FIG. 6 illustrates a pattern 76 which may be created using the tools 56. Preferably, the tools 56 are located in a toolbar 54 that is adjacent the pattern building area 69, as illustrated in FIG. 6. The toolbar 54 serves as an area shown on the display 36 in which the tools 56 may reside.

Figure 3:
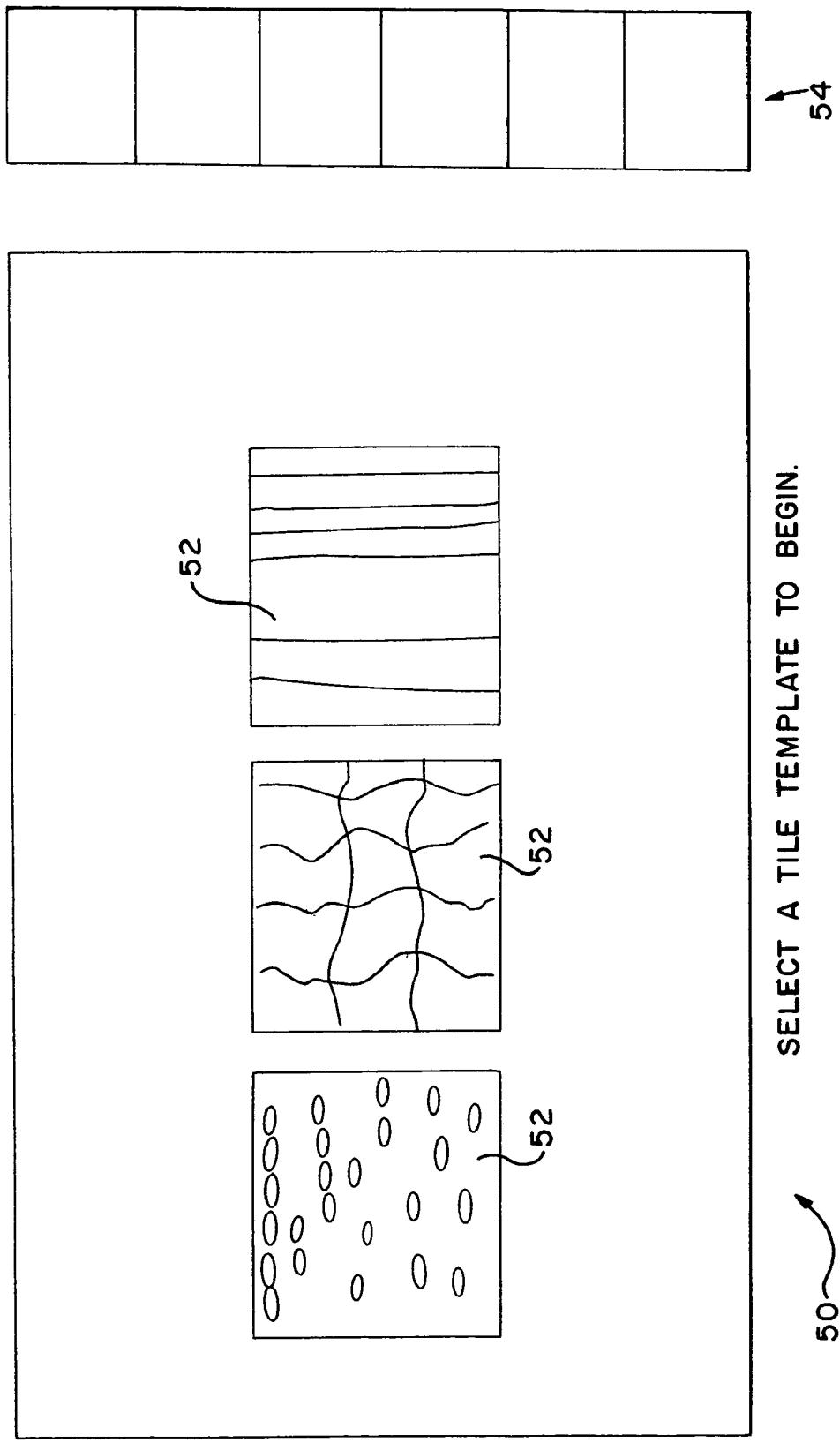
FIG. 3 illustrates a selection screen of a program, according to one embodiment.

In one embodiment, upon running the program 26, the program 26 will instruct the processor 22 to display a selection screen 50 on the display 36, as illustrated in FIGS. 1 and 3. The selection screen 50 presents the client with a plurality of tile templates 52 to select from. Each tile template 52 includes an image that portrays a particular style or look. The program 26 may also instruct the processor 22 to display an empty toolbar 54 adjacent to the selection screen 50, as illustrated in FIG. 3. The empty toolbar 54 contains spaces in which tools 56 will be later placed in upon selection of a tile template 52. Preferably, upon displaying the selection screen 50, the program 26 instructs or prompts the client to select a tile template 52, as illustrated in FIG. 2.

Figure 4:
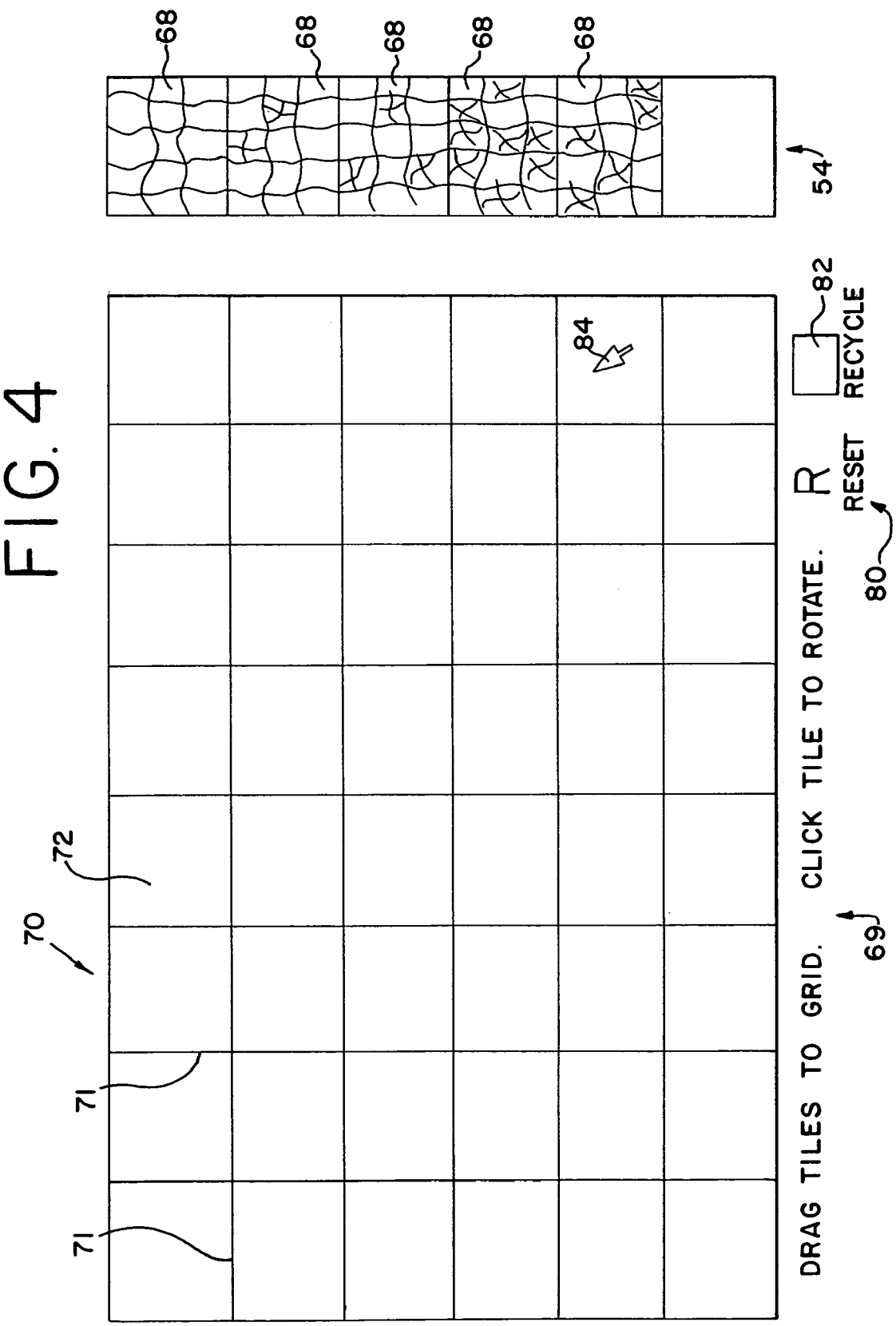
FIG. 4 illustrates a grid and a toolbar of a program, according to one embodiment.

Upon selection of a tile template 52, the program 26 then provides the client with at least one, and preferably a plurality of, tiles 68 for forming the pattern 76, as illustrated in FIG. 4. Preferably, tiles 68 all have the same style or look as the tile template 52. Preferably, the tiles 68 are positioned in the toolbar 54. Additionally, upon selection of a tile template 52, the program 26 also removes the selection screen 50 from the display 36 and provides the client with the pattern building area 69 for building the pattern 76 upon. Preferably a variety of different types of tiles 68 having the same general style or look as the tile template 52 are provided to the client upon selection of the tile template 52, as illustrated in FIG. 5.

A tile 68 may be selected by the client using a pointer 84, and then dragged by the client to the pattern building area 69. The tile 68 may be positioned anywhere within the pattern building area 69 in order to form a pattern, as illustrated in FIG. 5. Multiple copies of the tile 68, or multiple tiles 68, may be dragged and positioned within the pattern building area to form a pattern 76. In one embodiment, the pattern building area 69 includes a grid 70. The grid 70 includes a series of lines 71 that are used to assist the client in building the pattern 76. The lines 71 form spaces 72 in which tiles 68 may be positioned in. A tile 68 may be selected by the client using a pointer 84, and then dragged by the client onto the grid 70. The tile 68 may be positioned is any space 72 within the grid 70 in order to form a pattern, as illustrated in FIG. 5. Preferably, upon dragging the tile 68 to the grid 70, and upon releasing the tile within the grid 70, the tile 68 is automatically positioned within the nearest space 72, as illustrated in FIG. 5.

Upon placing the tile 68 in the pattern building area 69, the tile 68 may be moved or repositioned within the pattern building area 69 by re-selecting the tile 68 with the pointer 84 and dragging the tile 68 to another place within the pattern building area 69. Preferably, upon placing the tile 68 in the patterning building area 69, the tile 68 may be rotated within the pattern building area 69 by clicking on the tile 68 using the pointer 84.

Figure 5:
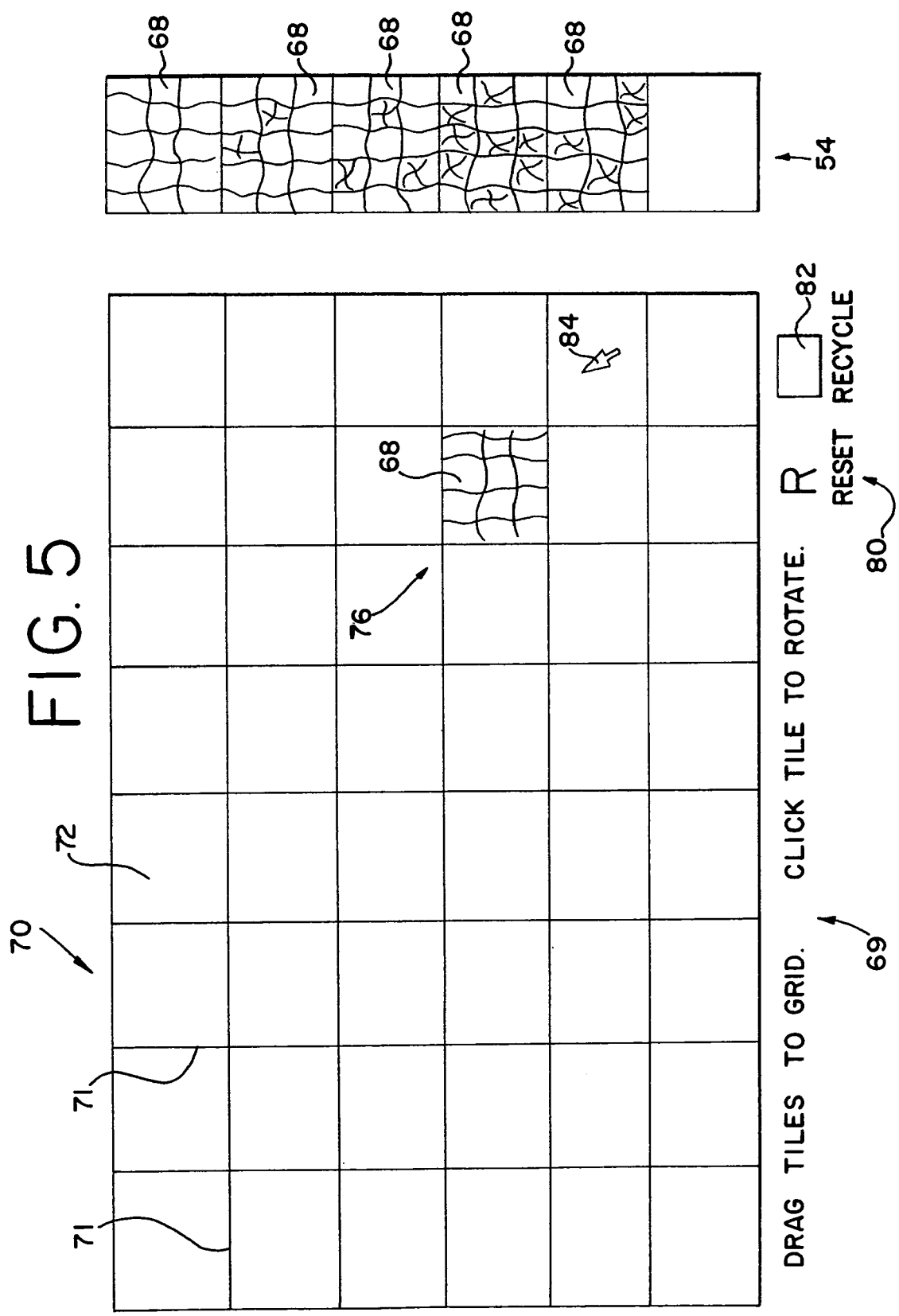
FIG. 5 illustrates a grid and a toolbar of a program, according to one embodiment.

In one embodiment, the program 26 displays a reset button 80 adjacent the pattern building area 69, as illustrated in FIG. 5. The reset button 80 erases any existing pattern 76 that is formed or being formed in the pattern building area 69, allowing the client to form a new pattern 76. In one embodiment, the program 26 displays a recycle button adjacent the pattern building area 69, as illustrated in FIG. 5. The recycle button 82 allows the client to remove or delete a single tile 68 from the pattern building area 69 by selecting that tile 68 with the pointer and dragging the tile 68 onto the recycle button 82.

In one embodiment, the program prompts or instructs the client to drag a tile 68 to the pattern building area 69 or to the grid 70, as illustrated in FIG. 5. Additionally, in one embodiment, the program prompts or instructs the client to click on a tile 68 in the pattern building area 69 in order to rotate that tile 68, as illustrated in FIG. 5.

By using the above-described pattern building program 26, the client is provided the ability to create an almost endless variety of patterns 76, and in turn, select from an almost endless amount of items 78 that are based upon the patterns 76.

Preferably, once the pattern 76 is built by the client, the pattern 76 is placed in a format that can be used by the manufacturer to manufacture the item 78. The item 78 is manufactured based upon the pattern 76, as illustrated in FIG. 9. As used herein, an item 78 that is based upon a built pattern 76, is an item that closely resembles or that has a likeness of the pattern 76. An item 78 that is based upon a built pattern 76 does not need to be an exact copy the pattern 76. Manufacturers may manufacture a variety of items 78 based upon the pattern. Items 78 include any product that displays a pattern. Preferably, items 78 include products used for decorating interiors of homes and buildings, such as textiles, fabrics, tiles, flooring, carpeting, and wallpaper. However, items 78 may also include clothing, furniture, and appliances.

Figure 7:
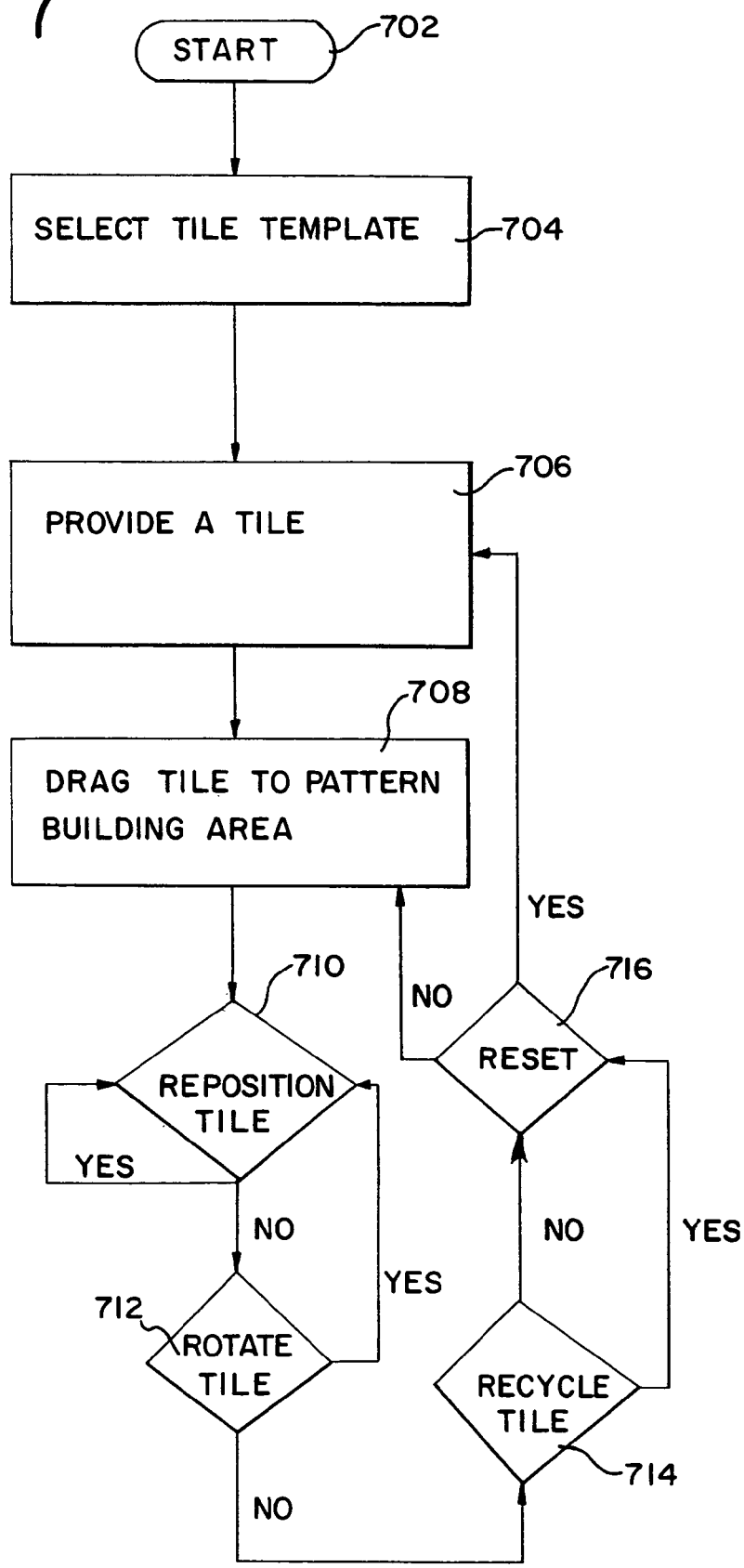
FIG. 7 illustrates a block diagram for building a pattern, according to one embodiment.

FIGS. 7 and 8 are flowchart illustrations of methods, apparatus (systems) and computer program products according to the invention. It will be understood that each block of the flowchart illustrations in FIGS. 7 and 8, and combinations of blocks in the flowchart illustrations in FIGS. 7 and 8, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a storage device that can direct a computer or other programmable data processing apparatus to function in a particular manner, such that the instructions stored in the storage device produce an article of manufacture including instruction means which implement the function specified in the flowchart block or blocks. The computer program instructions may also be loaded onto a computer or other programmable data processing apparatus to cause a series of operational steps to be performed on the computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations in FIGS. 7 and 8 support combinations of means for performing the specified functions, combinations of steps for performing the specified functions and program instruction means for performing the specified functions. It will also be understood that each block of the flowchart illustrations in FIGS. 7 and 8, and combinations of blocks in the flowchart illustrations in FIGS. 7 and 8, can be implemented by special purpose hardware-based computer systems which perform the specified functions or steps, or combinations of special purpose hardware and computer instructions.

As seen in FIG. 7 a start operation is initiated in block 702. The start operation initiates the pattern building program 26. The start operation can be automatically performed, or it can be manually performed by a user, such as the manufacturer or the client. Upon initiating the pattern building program 26 in block 702, the client is then prompted or instructed to select a tile template 52, preferably from a plurality of tiles templates 52. Upon selecting the tile template 52 in block 704, the program 26 then provide at least one tile 68, and preferably a plurality of tiles 68, for forming the pattern 76, as illustrated in block 706. Preferably, the tiles 68 are located in a toolbar 54 adjacent a patterning building area 69. The client is then prompted to drag a tile 68 to the pattern building area 69 in order to form a pattern 76, as shown in block 708. Upon dragging the tile 68 into the pattern building area 69, the client has the option of repositioning the tile 68 within the pattern building area 69, as shown in block 710. If the tile 68 is repositioned, then the pattern building program 26 moves back to block 710. If the tile 68 is not repositioned, then the pattern building program 26 moves to block 712, wherein the client is given the option of rotating the tile 68. If the tile 68 is rotated, then the pattern building program 26 moves back to block 710. If the tile 68 is not rotated, then the pattern building program 26 moves to block 714, wherein the client is given the option of recycling or erasing the tile 68. Whether or not the tile 68 is recycled or erased, the pattern building program 26 moves to block 716. At block 716, the client is given the option to reset or erase the entire pattern 76. If the client resets or erases the entire pattern 76, then the pattern building program 26 moves to block 706. If the client does not reset or erase the entire pattern 76, then the pattern building program 26 moves to block 708.

As seen in FIG. 8, a method for manufacturing an item 78 based on a built pattern 76, is shown. As illustrated in block 802, a pattern building program 26 for building a pattern 76 is provided to a client. Upon providing the pattern building program 26 to the client, the client is then instructed to build a pattern 76 using the pattern building program 26, as shown in block 804. Once a pattern 78 has been built using the pattern building program 26, the manufacturer then manufactures an item 78 based upon the built pattern 76, as shown in block 806.

While the invention has been described and illustrated, this description is by way of example only. Additional advantages will occur readily to those skilled in the art, who may make numerous changes without departing from the true spirit and scope of the invention. Therefore, the invention is not limited to the specific details, representative machines, and illustrated examples in this description. Accordingly, the scope of this invention is to be limited only as necessitated by the accompanying claims.

The invention claimed is:

1. A method of manufacturing an item, the method comprising:
   providing a computer-implemented pattern building program to a user, wherein the user may build a pattern using the program, wherein the program provides a plurality of tile templates for selection, wherein upon selection of a tile template, the program generates a plurality of tiles for forming the pattern, wherein each generated tile includes visual elements that are at least in part the same as at least some of the visual elements of the selected tile template, each generated tile having a different visual appearance, wherein the program provides the user with a grid which forms a plurality of spaces each for placing one of the tiles in, wherein the grid is adjacent a toolbar, and wherein the program prompts the user to form the pattern by dragging one of the tiles onto one of the spaces; and
   manufacturing the item based on the pattern.

2. The method of claim 1, wherein the item is one of a textile, a tile, a wallpaper, or a carpet.

3. The method of claim 1, wherein the program prompts the user to select the tile template, and wherein the program provides at least one of the generated plurality of tiles to the user upon selection of the tile template.

4. The method of claim 3, wherein a plurality of tiles are provided.

5. The method of claim 1, wherein the program provides the user with a plurality of tools for building the pattern.

6. The method of claim 5, wherein the tools includes a pencil tool, a paintbrush tool, a rubber stamp tool, a paint can tool, and a selection tool.

7. A computer-readable medium containing a computer program that causes a data processing system to perform a computer-implemented method for building a pattern for use in manufacturing an item based on the pattern, the computer program comprising:
   tile template generation code for providing a plurality of tile templates;
   tile generation code for generating a plurality of tiles upon selection of a tile template, wherein each tile includes visual elements that are at least in part the same as at least some of the visual elements of the selected tile template, each tile having a different visual appearance;
   selection code for providing a user with a plurality of the generated tiles for selection;
   tool code for providing a client tools for building a pattern; and
   format code for outputting the pattern in a format that may be used to manufacture the item.

8. The computer-readable medium of claim 7 further comprising grid code for generating a grid to help the user build the pattern.

9. The computer-readable medium of claim 7, wherein the tool code provides the user with a plurality of tools for building the pattern.

10. The computer-readable medium of claim 9, wherein the tools includes a pencil tool, a paintbrush tool, a rubber stamp tool, a paint can tool, and a selection tool.

11. A method for building a pattern for use in manufacturing an item based on the pattern, the method comprising:
    providing a plurality of tile templates for selection;
    upon selection of a tile templates, generating a plurality of tiles for forming the pattern, wherein each tile includes visual elements that are at least in part the same as at least some of the visual elements of the selected tile template, each tile having a different visual appearance;
    providing the user with a grid which forms a plurality of spaces each for placing one of the tiles in, wherein the grid is adjacent a toolbar; and
    prompting the user to form a pattern by dragging one of the tiles onto one of the spaces.

12. The method of claim 11 further comprising providing the user with at least one of the generated plurality of tiles upon selection of the tile template.

13. An item manufactured based upon a pattern built by the method of claim 12, wherein the item is one of a textile, a tile, a wallpaper, or a carpet.

14. The method of claim 11 further comprising displaying an image of the tile in one of the spaces upon placing the tile in of the spaces.

15. The method of claim 14 further comprising rotating the tile upon selection by the client.

16. The method of claim 14 further comprising removing the tile upon selection by the client.

17. An item manufactured based upon a pattern built by the method of claim 11, wherein the item is one of a textile, a tile, a wallpaper, or a carpet.

* * * * *